Figures 1, 2:
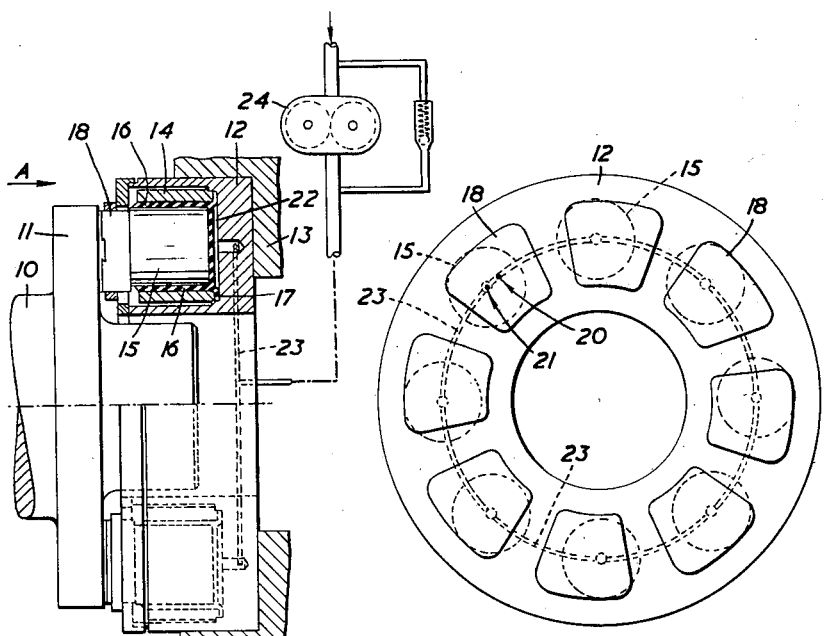

May 30, 1961   J. R. W. BLOCK ET AL   2,986,431
PAD TYPE THRUST BEARINGS
Filed Feb. 5, 1959

INVENTORS
JOSEPH DUDLEY S. de GUERIN
JOHN R. W. BLOCK

BY
Watson, Cole, Grindle & Watson
ATTORNEY

United States Patent Office 2,986,431
Patented May 30, 1961

2,986,431
PAD TYPE THRUST BEARINGS

John R. W. Block, London, and Joseph Dudley Shuldham de Guerin, Whitton, England, assignors to D. Napier & Son Limited, London, England, a British company Filed Feb. 5, 1959, Ser. No. 791,387

Claims priority, application Great Britain Feb. 5, 1958

10 Claims. (Cl. 308—160)

This invention relates to pad bearings such as stepped pad or so called tilting-pad thrust bearings which comprises a supporting member carrying a number of pads or small bearing elements circumferentially spaced about the axis of the bearing, each pad having a bearing face lying approximately in a common plane normal to the axis of the bearing. In the case of tilting pad bearings each pad is capable of at least limited pivotal movement relative to the supporting member about an axis which has a substantial radial component of direction.

It has been found that in operation the axial load imparted varies from one pad to another, probably as a result of small machining inaccuracies or varying flexibilities in the structure. Even with the most careful attention to the accuracy of machining it is found that substantial inequalities occur in the loads carried by the various pads of the bearing. In highly loaded bearings these load inequalities are objectionable and it is an object of the invention to provide an improved thrust bearing of this kind which will afford a further improvement in the equal distribution of the loads on the pads.

Now according to the present invention each pad is so supported on the supporting member as to be capable of bodily movement against a restraining force in a direction substantially parallel to the axis of the bearing.

Thus in one particular preferred construction each pad is connected to or formed integral with a piston lying in a co-operating cylinder in the supporting member so as to be capable of axial movement therein. The cylinder may be filled with a liquid, which term is used herein to include not only true liquids but also semi-solid substances having liquid flow properties such as grease or rubber.

In such case each cylinder is preferably connected through a conduit or passage to at least one other cylinder, the conduit or passage also being filled with a liquid. To provide an effective distribution of the loads preferably each pair of cylinders lying diametrically opposed to one another are connected together.

The restraining force acting on all the pads is preferably identical or approximately so and according to another preferred feature of the invention all the cylinders are connected to one another.

Thus conveniently all the cylinders may be connected to a common source of liquid under pressure.

According to a preferred feature of the invention the cylinders are connected to means for measuring the pressure of the liquid therein, and thus for providing an indication of the total thrust transmitted.

In an alternative construction each cylinder is filled with a readily deformable elastic solid substance such as rubber, and is provided with a restricted orifice through which the elastic solid substance can be caused to flow by deformation.

In any case each piston is preferably a loose fit in the respective cylinder, to allow for small pivotal movements, and is connected thereto by a deformable fluid tight seal, such as an annular rubber element bonded to the piston and to the cylinder.

According to a preferred feature of the invention the centre of the operative bearing surface of the pad is offset in a circumferential direction from the centreline of the associated piston, in the same direction as the direction of relative movement of the supporting member relative to the opposed bearing face.

According to another aspect of the invention each pad is connected to the supporting member by means of a resilient element having a low "rate," and tending to resist movements of the pad in an axial direction caused by the load on the bearing.

Figures 3, 4:
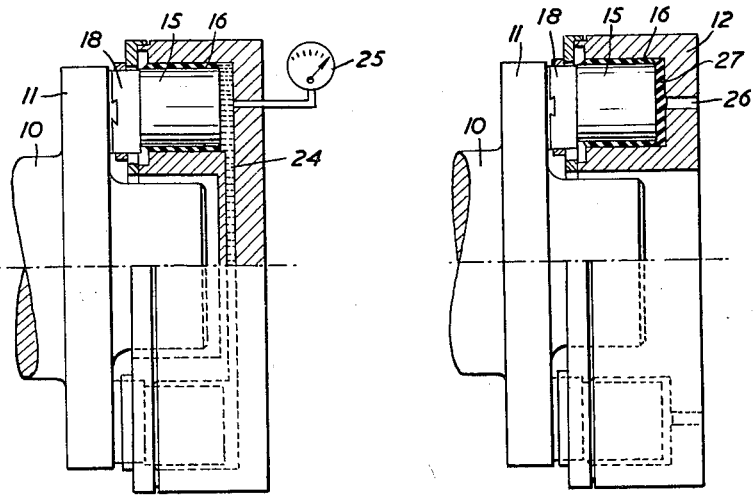

The invention may be performed in various different ways but three specific embodiments with some modifications thereof will now be described by way of example with reference to the accompanying drawings in which:

Figure 1 is a sectional side elevation through a thrust bearing assembly according to the invention, Figure 2 is an end view of the non-rotary parts thereof as seen in the direction of the arrow A in Figure 1, Figure 3 is a sectional side elevation through an alternative form of the invention, and Figure 4 is a similar view of another alternative.

In the first example the thrust bearing assembly includes a shaft 10 having an annular thrust flange 11, and a housing 13 supporting a rigid supporting member 12 having eight cylindrical recesses formed in one annular face adjacent the flange 11, equally spaced circumferentially about the axis. Within each recess is fitted a hollow sleeve 14 constituting a cylinder within which is mounted a cylindrical piston 15, which is of slightly smaller external diameter than the cylinder and is sealed thereto by an annular rubber insert 16 bonded to the adjacent cylindrical walls of the piston and cylinder, to permit small pivotal movements and displacements of the piston in an axial direction. A radial flange 17 on each insert is gripped between the sleeve 14 and the member 12. On the part of each piston 15 which projects from the respective cylinder is pivotally supported a tilting thrust pad 18 which comprises a short root portion having a radial pivoting edge in contact with the outer face of the piston and a cantilever portion which extends from the root portion in the general plane of the pad in the direction of relative rotation of the retaining ring relative to the opposed bearing surface. Such tilting pads are well known in themselves and will not be described in greater detail. The centre of pressure 20 of the bearing surface of each pad 18 is displaced in this same direction from the centreline 21 of the piston, as seen in Figure 2.

In an alternative form the thrust pad 18 might be rigidly connected to the piston 15 in which case the hydrodynamic oil pressure acting on the pad would tend to rock the pad and the piston about a substantially radial axis, this rocking movement being accommodated by the rubber sealing insert 16 between the piston and the cylinder.

In the free state of the rubber inserts 16 the inner ends of the pistons are all spaced appreciably from the inner end walls 22 of the cylinders and the chambers so formed at the inner ends of the cylinders are connected to one another by a common gallery 23 adjacent the rear face of the retaining ring. This gallery is in communication with a high pressure oil supply 24 or alternatively it may be sealed.

It will be seen therefore that each piston is subject on its inner end to a hydraulic pressure loading which is identical for all pistons and the pistons will therefore move in an axial direction automatically to provide at least an approximate balance between the individual thrust loads on the pads.

In the second example illustrated in Figure 3 the same basis features are present but in this case the individual cylinders are connected by a common gallery 24, which is connected to a pressure indicating device 25. In this case the pressure of the liquid in the gallery will also be uniform between the various pistons. As a result any movement of one piston in a direction away from the opposed bearing face will tend to cause the movement of the remaining pistons in the opposite direction. In the result the pistons will all adopt positions in which the thrust loading is substantially equal, and the total thrust transmitted will be indicated by the instrument 25.

In the example of Figure 4 the pistons 15 are again mounted within individual cylinders, by means of rubber inserts 16, but the cylinders are not connected hydraulically to one another. Each cylinder is connected to an individual vent passage 26 leading to the rear or outer face of the supporting member which will be at atmospheric or other similar pressure. The chamber at the inner end of each cylinder in this example is filled with a readily deformable resilient solid substance 27 such as rubber and any force on the thrust pad 18 tending to move the piston towards the closed end of the cylinder will squeeze rubber through this restricted vent passage 26. The system acts as a spring with a very low "rate;" that is to say the restraining force applied by the resilience of the rubber alters only slightly at different positions of the piston which in any case will have an extremely small range of movement. As a result the individual tilting pads and pistons will take up positions where the thrust loads on the pads are substantially identical.

What we claim as our invention and desire to secure by Letters Patent is:

1. A pad-type thrust bearing comprising a supporting member, a plurality of bearing pads circumferentially spaced about the axis of the bearing each with a bearing face lying approximately in a common plane normal to the axis, a piston and cylinder assembly supporting each pad from the supporting member, each piston and cylinder being connected respectively to the supporting member and its bearing pad, wherein the piston is capable of restricted movement radially of the axis to allow the pad to tilt, and wherein the piston is capable of relative movement in the cylinder in a direction parallel to the axis of the bearing, to allow bodily movement of the pad, and means providing a restraining force against such bodily movement.

2. A pad bearing as claimed in claim 1 in which each cylinder has a closed end filled with a readily deformable elastic solid substance such as rubber, and is provided with a restricted orifice through which the elastic solid substance can be caused to flow by deformation.

3. A bearing as claimed in claim 1, in which each piston is a loose fit in the respective cylinder, and is connected thereto by a deformable annular element bonded to the piston and to the cylinder.

4. A pad bearing as claimed in claim 3, in which each annular element is of elastic material, and is of cylindrical form, having appreciable axial length, and considerably smaller radial thickness, thus locating the respective pad in directions normal to the axis, while providing a resilient restraining force against movements parallel to the axis.

5. A pad bearing as claimed in claim 1, in which each cylinder is filled with a liquid and is connected through a conduit to at least one other cylinder, the conduit also being filled with a liquid.

6. A pad bearing as claimed in claim 5, in which each pair of cylinders lying diametrically opposed to one another are connected together.

7. A pad bearing as claimed in claim 6, in which all the cylinders are connected to one another.

8. A pad bearing as claimed in claim 7 in which all the cylinders are connected to a common pressure source of hydraulic fluid.

9. A pad bearing as claimed in claim 1, in which the closed end of each cylinder is filled with a liquid, and is connected through a fluid conduit to the remaining cylinders, and including means for measuring the pressure of the fluid in the cylinders and hence obtaining an indication of the thrust transmitted by the bearing.

10. A pad bearing as claimed in claim 1 in which the centre of the operative bearing surface of each pad is off-set in a circumferential direction from the centreline of the associated piston.

References Cited in the file of this patent

UNITED STATES PATENTS 1,421,208     Gauldie _____ June 27, 1922